(12) United States Patent
Baek

(10) Patent No.: US 6,409,487 B1
(45) Date of Patent: Jun. 25, 2002

(54) SHOE WITH INFLATABLE BLADDER AND SECURE DEFLATION VALVE

(75) Inventor: Jai K. Baek, San Diego, CA (US)

(73) Assignee: DC Shoes, Inc., Vista, CA (US)

( * ) Notice: Subject to any disclaimer, the term of this patent is extended or adjusted under 35 U.S.C. 154(b) by 0 days.

(21) Appl. No.: 09/738,947

(22) Filed: Dec. 15, 2000

Related U.S. Application Data

(63) Continuation-in-part of application No. 09/660,265, filed on Sep. 12, 2000.

(51) Int. Cl.[7] .......................... F04B 41/00; A43B 13/20
(52) U.S. Cl. ............................. 417/440; 251/321; 36/29
(58) Field of Search ................... 417/440, 472; 36/29, 93; 251/321, 900

(56) References Cited

U.S. PATENT DOCUMENTS

| | | | | |
|---|---|---|---|---|
| 5,960,485 A | * | 10/1999 | Mihara | 4/443 |
| 6,186,477 B1 | * | 2/2001 | McCombs et al. | 251/323 |
| 6,189,172 B1 | * | 2/2001 | Back | 12/142 P |

* cited by examiner

Primary Examiner—Charles G. Freay
(74) Attorney, Agent, or Firm—K. David Crockett, Esq.; Crockett & Crockett

(57) ABSTRACT

An inflatable shoe with a deflation valve designed to limit inadvertent operation of the valve and thereby limit inadvertent deflation of the shoe. The deflation valve has a shortened plunger, a collar to prevent tilt of the plunger, and a conformable ring on the valve face. The plunger is provided with a groove sized and dimensioned to partially receive the inner surface of the ring.

4 Claims, 4 Drawing Sheets

SHOE WITH INFLATABLE BLADDER AND SECURE DEFLATION VALVE

This application is a continuation-in-part application of U.S. Application Ser. No. 09/660,265 filed Sep. 12, 2000.

FIELD OF THE INVENTIONS

The inventions described below relate to the field of valves, and more specifically to valves suitable for use with inflatable garments such as shoes and boots.

BACKGROUND OF THE INVENTION

A number of shoes and boots may be improved with the use of air bladders placed within the shoe or boot. The air bladders are preferably selectively inflatable and deflatable, so that a wearer can adjust the fit of the shoe. The pump device is popular with basketball shoes, ski boots, and snowboard boots. Lakic, Miniature Universal Pump And Valve For Inflatable Liners, U.S. Pat. No. 5,846,063 (Dec. 8, 1998) illustrates a number of embodiments of such inflatable garments, and a number of embodiments for various components of the devices.

The inflatable shoes use a bladder pump for inflation, and a simple finger operated plunge valve to deflate the inflatable bladder. The plunge valve is operated merely by pushing a small plunger or valve stem inwardly toward the boot. Both the bladder pump and the plunge valve are placed on the surface of the shoe, and are easily accessible to the wearer. However, where the shoe is used in a rough activity, such as skiing or snowboarding, contact between the shoe and the ground, or the skis or snowboard, can inadvertently depress the plunger, and thereby operate the deflation valve. Thus, having once inflated the bladder to obtain optimum fit of the shoe, the shoe is likely to deflate during a ski run or snowboard run, when proper fit is most important.

SUMMARY

The devices described below provide a secure deflation valve for a shoe or boot. The deflation valve is less subject to inadvertent deflation caused by the rough and tumble of the activity for which the shoe is worn. The deflation valve includes a non-conformable valve housing, which cannot be deformed relative to the plunger of the valve. The valve body also has a closely fitting port through which the plunger exits the valve, thereby limiting the potential tilt of the plunger relative to the valve body and valve seat. Additionally, the plunger is much shorter than prior plungers, and the valve face is provided with a soft silicon sealing ring (like an 0-ring) which conforms to the space between the valve face and valve seat during any tilting movement of the valve face and valve seat.

While developed for use with snowboard shoes and ski boots, the valve may be used for any selectively inflatable bladder where it is desired to provide a more secure deflation valve that is not subject to inadvertent operation during use of the bladder.

DETAILED DESCRIPTION OF THE INVENTIONS

Figure 1:
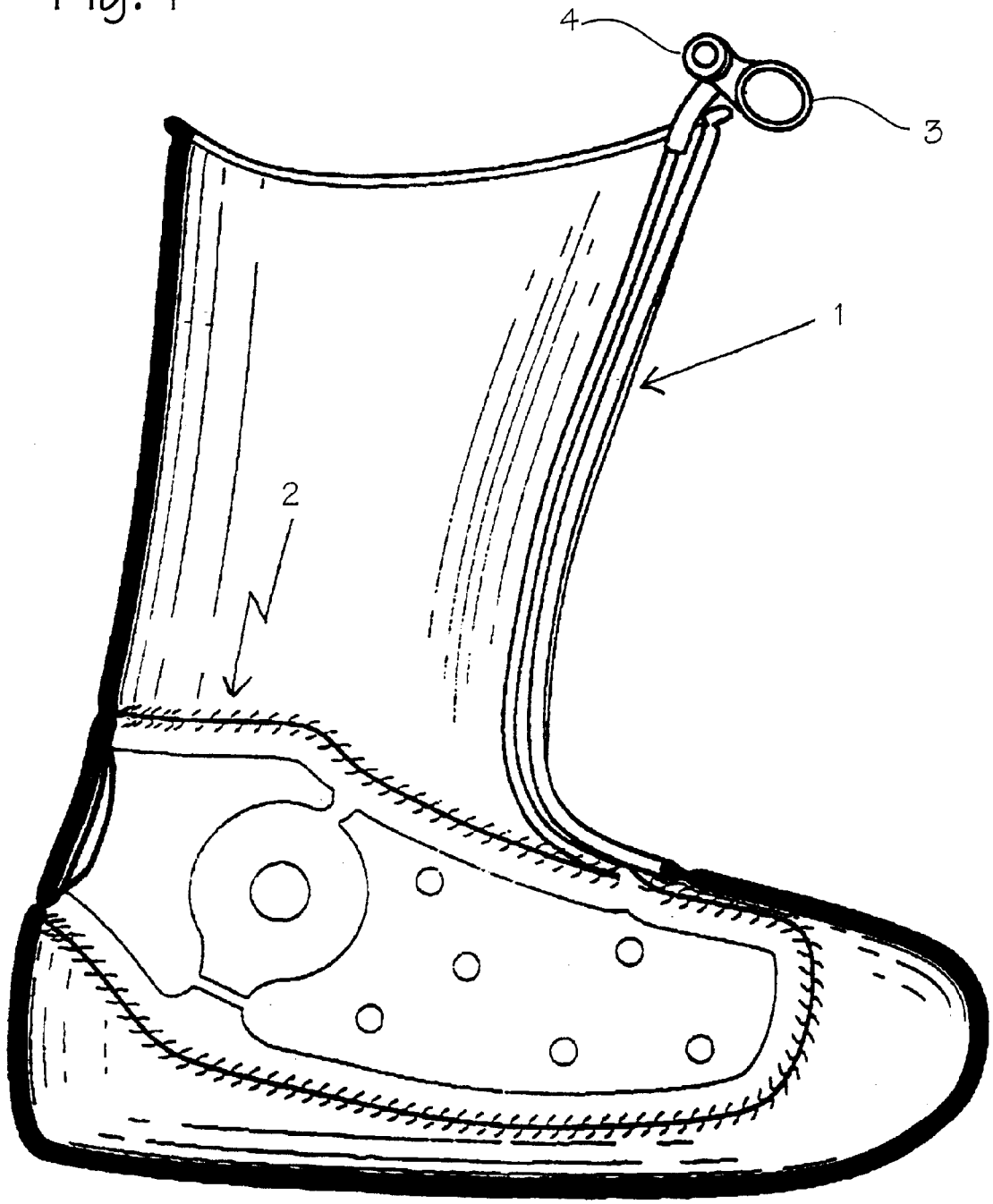
FIG. 1 is a view of the device in one intended use, namely a sport shoe with an inflatable bladder.

FIG. 1 is a view of the device in a sport shoe with an inflatable bladder. The shoe 1 may be any type of shoe, such as a ski boot, snowboard boot, or basketball shoe. The shoe has a bladder 2, which is located in the shoe in positions dependant on the use of the shoe. For example, the bladder may be located on the tongue of shoe, on the uppers, the sole, or around the heel. The pump 3 and the deflation valve 4 are located in any convenient place on the shoe or boot, and they are shown here located in the upper, high on the lateral side of the shoe. To operate the pump, the wearer repeatedly squeezes the pump until the desired degree of inflation is achieved. To deflate the bladder, the operator pushes the plunger on the deflation valve.

Figure 2:
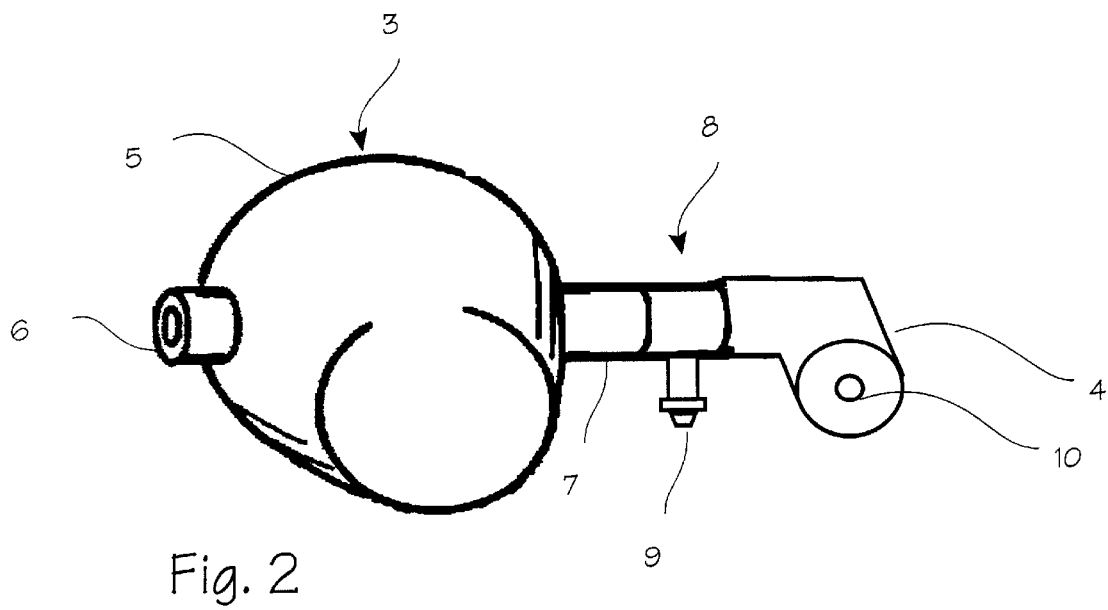
FIG. 2 is an elevational view of the valve shown in its housing, which is integral with the bladder pump.

FIG. 2 is an elevational view of the valve shown in its housing, which is integral with the bladder pump. The bladder pump 3 simply comprises a bulb 5, an inlet port 6 which takes suction on the surrounding air or other fluid (and includes a check valve so that fluid once sucked into the bulb cannot exit this port), and an outlet port 7 (the outlet port also includes a check valve so that air once forced out of bulb and into the shoe bladder cannot bleed out of the shoe bladder and into the bulb). The outlet port communicates with the T-junction 8. The T-junction connects the bladder supply port 9, the pump outlet, and the deflation valve. The deflation valve 4 has an input port in immediate fluid communication with the bladder supply port through the T-junction, and an output port through the opening on the top of the valve (more fully shown in FIG. 4.)

When operated by the user, the deflation valve allows air from the bladder to exhaust to the atmosphere. The deflation valve is operated by depressing the plunger 10, and holding the plunger down until the air in the bladder has exhausted through the valve. The pump and deflation valve assembly are mounted on the shoe, as shown in FIG. 1. As can be appreciated from these drawings, the plunger 10 is susceptible to inadvertent operation since it requires only minor force to operate, and the valve is located such that it is subject to depression during inadvertent contact with objects, the ground and ground debris, and the operator and equipment carried by the operator.

Figure 3:
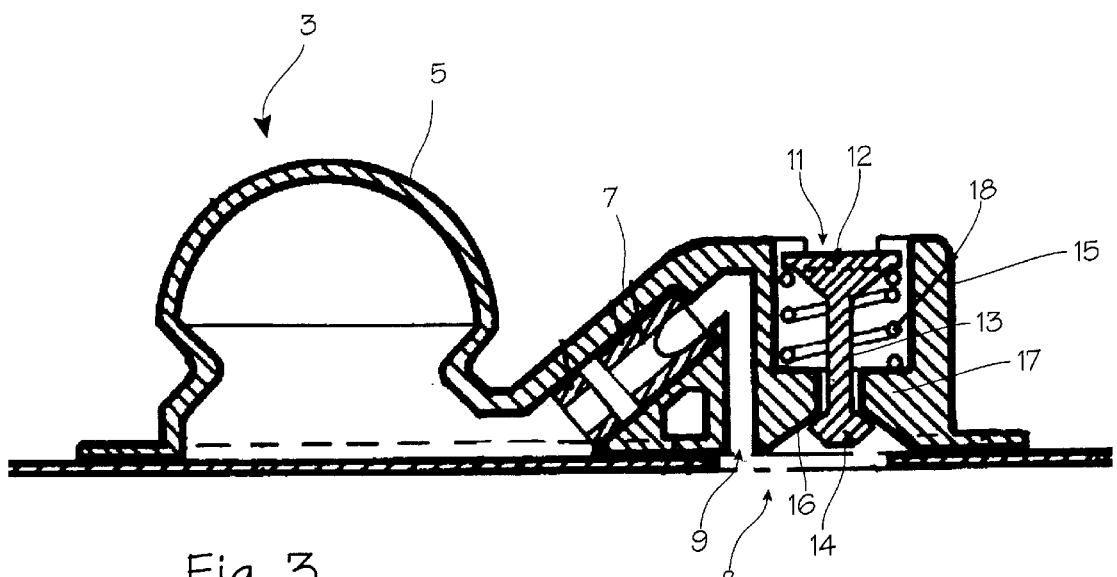
FIG. 3 is a cross-section of a prior art valve.

FIG. 3 is a cross-section of a prior art pump and valve assembly. As in FIG. 2, the assembly comprises the bulb 5, pump inlet port 6, pump outlet port 7, T-junction 8, and bladder supply port 9. The deflation valve of the prior art, as illustrated in FIG. 3, uses a plunger 11 which additionally comprises a plunger disk 12, valve stem 13, a valve face in the form of ball 14, all within the valve body 15. The upper surface of the valve face is matched to the valve seat 16, formed on the lower surface of inner flange 17 which protrudes inwardly into the valve body. The valve spring 18 biases the plunger upward, forcing the valve face into contact with the valve seat with enough force to create an airtight seal. The valve body and flange are typically made of silicon or other soft elastic material.

Figure 4:
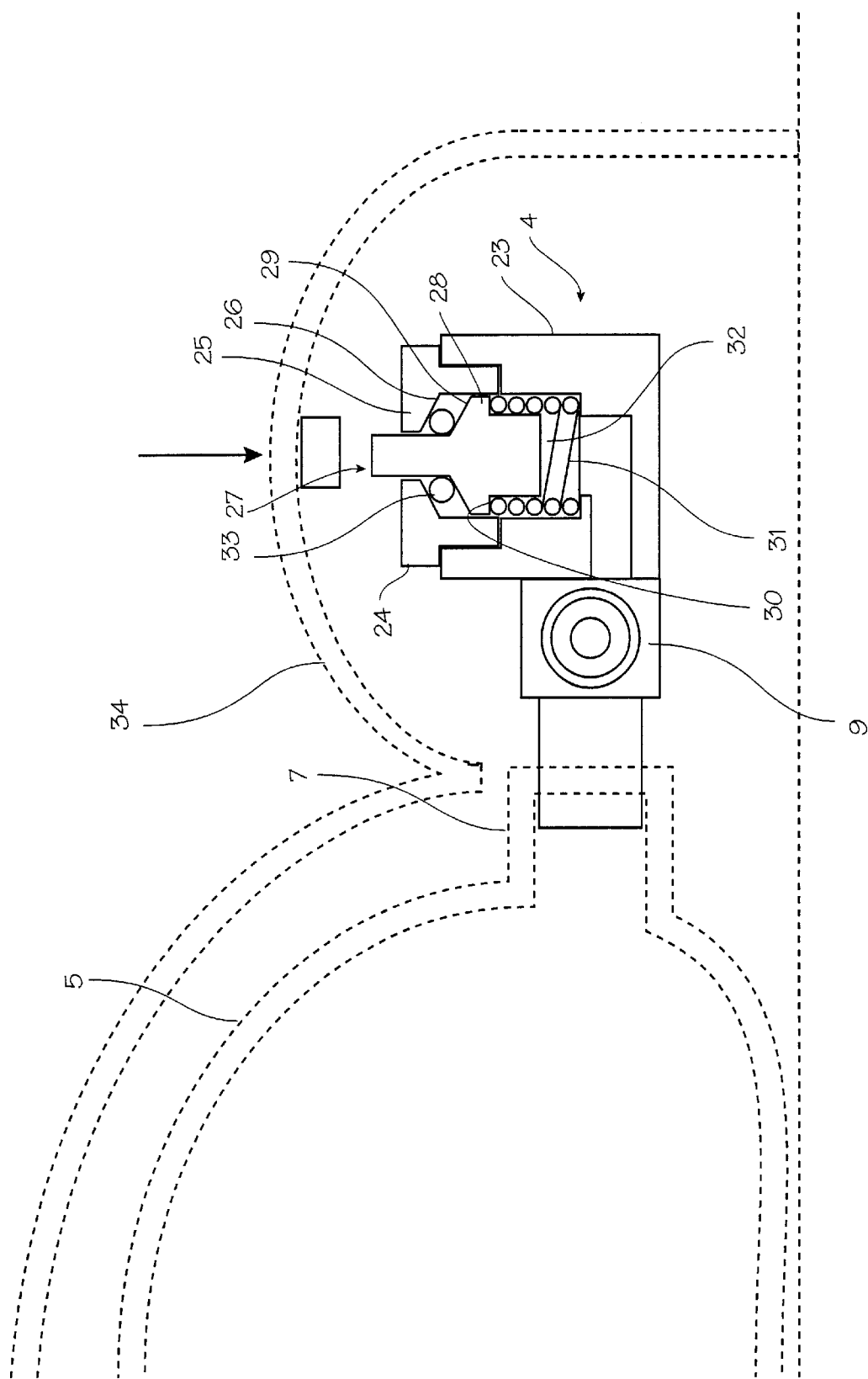
FIG. 4 is a cross section of a new deflation valve which minimizes chance of inadvertent unseating of the valve during use of the shoe.

FIG. 4 is a cross section of a new deflation valve which minimizes the chance of inadvertent unseating of the valve during use of the shoe. As in FIG. 2, the assembly comprises the bulb 5, pump inlet port (not shown), pump outlet port 7, T-junction 8, and bladder supply port 9. The deflation valve 4 comprises a two part valve body, with a lower valve body 23 made of a hard plastic, and an upper valve body 24 made of similar hard plastic or other relatively stiff and non-conformable material. The upper valve body is force fit into the lower valve body and glued in place. The upper valve body additionally comprises an inwardly protruding flange 25, located at or near the upper end of the valve body. The valve seat 26 is located on the lower surface of this flange. The plunger 27 is relatively short, and does not need a plunger disk on its upper extremity. At the upper end of the plunger, the plunger outer diameter is closely matched to the inner diameter or bore of the flange 25, with clearance to allow upward and downward movement, but closely matched to limit tilting and sideways movement. At the bottom of the plunger, a disk 28 provides a valve face 29 on the upper surface of the disk and a bottom surface 30 upon which biasing spring 31 may act. The plunger may include a lower extension 32 with a diameter smaller than the disk, closely matching the inner diameter of the biasing spring 31, which will serve to keep the spring and disk in vertical alignment and proper registration. The biasing spring is located below the plunger, and acts on the lower surface of the disk to force the plunger upwardly. The biasing spring rests on a surface provided by a flange or lower inner surface of the lower valve body. The plunger is preferably made of metal or hard plastic, and may generally be described as having a cylindrical upper segment of a first, small diameter, a middle segment of conical or frustoconical shape having a maximum outer diameter approximating the outer diameter of the spring (but in any case not substantially smaller than the outer diameter of the spring) and a lower segment having a diameter approximating the inner diameter of the spring. A soft, deformable ring 33 is placed on the plunger, above the disk 28, to enhance the sealing capability of the valve. The deformable ring may be fixed to the upper conical surface of the plunger mid-section or it may be fixed to the lower surface of flange 25, or it may merely be placed between the plunger and the flange. This ring is made of silicon rubber or similar soft, compliant material. This is particularly useful in case of any tilting of the plunger. The valve is covered by a rubber condom or housing 34, and can be operated by the operator through the rubber condom.

To operate the valve, the wearer merely pushes downwardly on the plunger 27. The close fit of the flange 25 around the plunger permits upward and downward movement, but inhibits side-ways or tilting movement of the plunger which would otherwise permit deflation. Since the spring is located below the plunger, and the valve seat is at the top of the valve, the plunger does not need to be long enough to pass all the way through the spring, thereby limiting the possible extent of tilting of the plunger. Also, because the valve body is made of hard plastic, deformation of the top of the valve body relative to the bottom of the valve body is not possible with the expected forces applied during snowboarding, skiing and other rough activities.

Figure 5:
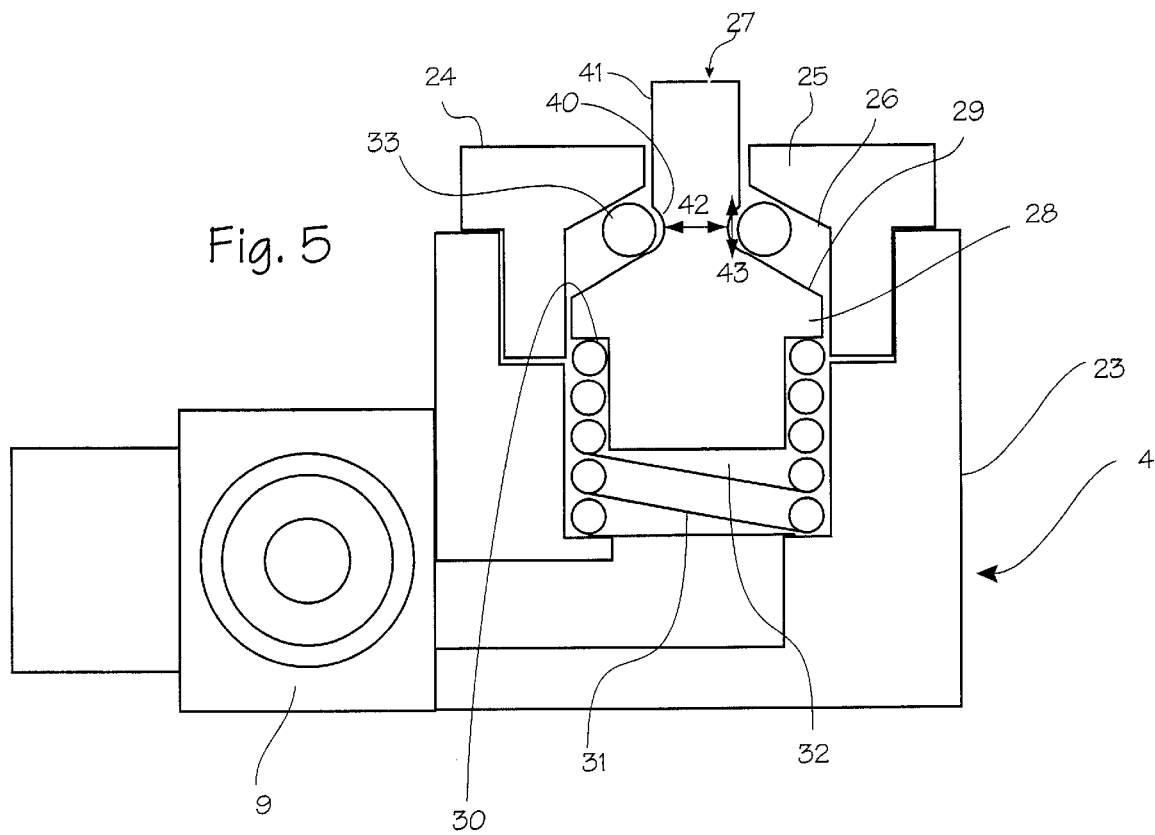
FIG. 5 is a cross section of the deflation valve with improvements to the valve stem.

FIG. 5 is a cross section of the deflation valve with improvements to the valve stem that ensure that the ring moves downwardly with the plunger during operation. The valve includes the parts described in relation to FIG. 4, including the lower valve body 23 and the upper valve body 24, the valve body flange 25 and the matching valve seat 26, the plunger 27, the disk 28 with its valve face 29 and bottom surface 30, the spring 31 and the lower extension 32 of the valve stem, and the deformable ring 33. The plunger has been modified vis-à-vis the plunger of FIG. 4 with the provision of an annular groove 40 circumscribing the upper segment of the plunger, near the junction of the upper segment 41 of the plunger to the disk 28. The dimensions of the annular groove are chosen to match the ring 33, such that the ring protrudes into the groove to an extent that provides some engagement between the upper segment and the ring, and downward movement of the upper segment and plunger exerts a downward force on the ring. The groove depth may be such that the resulting diameter 42 of the grooved segment of the plunger is slightly larger than the inner diameter of the ring, or it may be such that the resulting diameter is exactly equal to the inner diameter of the ring, or it may be such the resulting diameter is smaller than the inner diameter of the ring and the engagement between the plunger and the ring is loose in the horizontal plane established by the groove. The longitudinal extent 43 of the groove may likewise be variable, from heights which are smaller than the height of the ring, exactly matching the ring, or substantially larger than the ring, so long as inward or downward movement of the plunger will result in impingement of the groove upper surface on some portion of the ring during some portion of the inward or vertical throw of the plunger. (It should be noted that, in the above description, the terms vertical and upward are used in reference to the valve when positioned as shown, and they may have no relationship to the vertical and horizontal as the valve is fitted onto any particular boot.)

The devices described above have been described in the context of sport shoes using inflatable bladders. However, the deflation valve may be used with other selectively inflatable devices, such as sport helmets, water flotation aids, in medical devices such as dissection balloons, and in any other application where enhanced reliability and control over deflation of a selectively inflatable bladder is desired. Thus, while the preferred embodiments of the devices and methods have been described in reference to the environment in which they were developed, they are merely illustrative of the principles of the inventions. Other embodiments and configurations may be devised without departing from the spirit of the inventions and the scope of the appended claims.

I claim:

1. A pump and deflation valve assembly for use with a fluid bladder, said assembly comprising:

a bladder pump having an inlet port and an outlet port, said outlet port aligned to discharge fluid into the bladder;

a deflation valve having an input port in fluid communication with the bladder and an output port;

said deflation valve comprising:

a valve body comprised of a non-conformable material, said valve body having a bore extending therethrough, from the inlet port to the outlet port; an inwardly extending flange, said flange characterized by a bottom surface, a top surface, and a bore extending from the bottom surface to the top surface, said bottom surface serving as a valve seat;

a plunger extending through the bore, said plunger having an upper segment of small diameter making it capable of moving through the bore of the upper inwardly extending flange, said upper segment having an annular groove thereon, said plunger having a lower segment of larger diameter such that said lower segment cannot pass through the bore of the upper inwardly extending flange, said lower segment of the plunger having an upper surface positioned in apposition to the bottom surface of the upper inwardly extending flange and a lower surface; and a ring comprising a conformable material disposed between the plunger lower segment and the upper inwardly extending flange, said ring having an inner diameter slightly smaller than the diameter of the upper segment.

2. The device of claim 1 wherein the ring is disposed partially within the groove of the upper segment.

3. A shoe comprising:

at least one inflatable bladder disposed within the shoe;

a bladder pump in fluid communication with the bladder, said bladder pump having an inlet port and an outlet port, said outlet port aligned to discharge fluid into the bladder;

a deflation valve having an input port in fluid communication with the bladder and an output port;

said deflation valve comprising:

a valve body comprised of a non-conformable material, said valve body having a bore extending therethrough, from the inlet port to the outlet port, an inwardly extending flange, said flange characterized by a bottom surface, a top surface, and a bore extending from the bottom surface to the top surface, said bottom surface serving as a valve seat;

a plunger extending through the bore, said plunger having an upper segment of small diameter making it capable of moving through the bore of the upper inwardly extending flange, said upper segment having an annular groove thereon, said plunger having a lower segment of larger diameter such that said lower segment cannot pass through the bore of the upper inwardly extending flange, said lower segment of the plunger having an upper surface positioned in apposition to the bottom surface of the upper inwardly extending flange and a lower surface; and a ring comprising a conformable material disposed between the plunger lower segment and the upper inwardly extending flange, said ring having an inner diameter slightly smaller than the diameter of the upper segment.

4. The device of claim 3 wherein the ring is disposed partially within the groove of the upper segment.

* * * * *